US007496874B2

(12) United States Patent
Bickford et al.

(10) Patent No.: US 7,496,874 B2
(45) Date of Patent: Feb. 24, 2009

(54) SEMICONDUCTOR YIELD ESTIMATION

(75) Inventors: Jeanne Paulette Spence Bickford, Essex Junction, VT (US); Jason D. Hibbeler, Williston, VT (US); Juergen Koehl, Weil Schoenbuch (DE); William John Livingstone, Unerhill, VT (US); Daniel Nelson Mayuard, Craftsbury Common, VT (US)

(73) Assignee: Inetrnational Business Machines Corporation, Armonk, NY (US)

( * ) Notice: Subject to any disclaimer, the term of this patent is extended or adjusted under 35 U.S.C. 154(b) by 274 days.

(21) Appl. No.: 11/275,275

(22) Filed: Dec. 21, 2005

(65) Prior Publication Data

US 2007/0143720 A1 Jun. 21, 2007

(51) Int. Cl.
*G06F 17/50* (2006.01)

(52) U.S. Cl. ....................... 716/5; 716/1; 716/2; 716/4; 716/13; 716/14

(58) Field of Classification Search ..................... 716/1, 716/2, 4, 5, 13, 14; 703/2; 702/82, 84; 324/754, 324/537
See application file for complete search history.

(56) References Cited

U.S. PATENT DOCUMENTS

| | | | | |
|---|---|---|---|---|
| 5,231,349 | A * | 7/1993 | Majidi-Ahy et al. | 324/754 |
| 6,102,958 | A * | 8/2000 | Meystel et al. | 703/2 |
| 6,209,123 | B1 * | 3/2001 | Maziasz et al. | 716/14 |
| 6,317,859 | B1 * | 11/2001 | Papadopoulou | 716/4 |
| 6,324,481 | B1 * | 11/2001 | Atchison et al. | 702/84 |
| 6,715,133 | B2 * | 3/2004 | Brennan | 716/2 |
| 6,771,077 | B2 * | 8/2004 | Hamamura et al. | 324/537 |
| 6,813,572 | B2 * | 11/2004 | Satya et al. | 702/82 |
| 6,941,528 | B2 * | 9/2005 | Allen et al. | 716/2 |
| 6,948,141 | B1 * | 9/2005 | Satya et al. | 716/4 |
| 7,065,729 | B1 * | 6/2006 | Chapman | 716/13 |
| 7,299,426 | B2 * | 11/2007 | Bonges | 716/1 |
| 2005/0273739 | A1 * | 12/2005 | Tohyama | 716/4 |
| 2006/0064653 | A1 * | 3/2006 | Zhang et al. | 716/2 |
| 2006/0095877 | A1 * | 5/2006 | Su et al. | 716/5 |
| 2006/0190222 | A1 * | 8/2006 | Allen et al. | 703/2 |
| 2007/0136714 | A1 * | 6/2007 | Cohn et al. | 716/13 |

OTHER PUBLICATIONS

Harrison; "A simple via duplication tool for yield enhancement"; Oct. 24-26, 2001; Defect and Fault Tolerance in VLSI Systems, 2001. Proceedings. 2001 IEEE International Symposium on; pp. 39-47.*
Allan; "Targeted layout modifications for semiconductor yield/reliability enhancement";, Nov. 2004; Semiconductor Manufacturing, IEEE Transactions on; vol. 17, Issue 4pp. 573-581.*

(Continued)

*Primary Examiner*—Helen Rossoshek
(74) *Attorney, Agent, or Firm*—Ryan K. Simmons; Greenblum & Bernstein P.L.C.

(57) ABSTRACT

A method, apparatus, and computer program product that performs yield estimates using critical area analysis on integrated circuits having redundant and non-redundant elements. The non-redundant elements are ignored or removed from the critical area analysis performed for undesired opens.

9 Claims, 3 Drawing Sheets

400 Start
402 Generate GDD
404 CAA Shorts
406 CAA Opens
408 Generate Details
410 End

OTHER PUBLICATIONS

Yan; "Optimal via minimisation by selection of layer assignment and routing ordering in a bubble-sorting-based non-Manhattan channel"; Jan. 20, 2003: Computers and Digital Techniques, IEE Proceedings-vol. 150, Issue 1, pp. 21-27.*
Michalka et al.; "A redundant metal-polyimide thin film interconnection process for wafer scale dimensions"; , Nov. 1990;□□Semiconductor Manufacturing, IEEE Transactions on; vol. 3, Issue4pp. 158-167.*
NN950265;"Self-Timed Hit Circuit for a Content Addressable Memory"; Feb. 1995; IBM Technical Disclosure Bulletin;□□vol. No. 2; Issue No. 2; pp. 65-55.*
NN9311599; "Displaced Metal Conductor"; Nov. 1993; IBM Technical Disclosure Bulletin; vol. No. 36; Issue No. 11; pp. 599-602.*
NN84102880; "Algorithm to Compact a VLSI Symbolic Layout With Mixed Constraints"; Oct. 1, 1984; IBM Technical Disclosure Bulletin; vol. No. 27; Issue No. 5; pp. 2880-2887.*

* cited by examiner

204

202

206

SEMICONDUCTOR YIELD ESTIMATION

BACKGROUND

1. Technical Field of the Present Invention

The present invention generally relates to the semiconductors, and more specifically to the estimation of yield using critical area analysis.

2. Description of Related Art

The fabrication of Integrated Circuits (ICs) has become an extremely complex and expensive process that involves thousands of operations such as selectively implanting impurities into, and applying conductive and insulative layers onto, a semiconductor substrate. The ICs are manufactured as a group on a wafer that is eventually diced into individual ICs.

The number of good ICs on a wafer is referred to as yield and is influenced by any number of manufacturing processes each of which can introduce a defect. Defects are typically caused by foreign particles, minute scratches and other imperfections introduced during photoresist, photomask and diffusion operations.

The pricing of the ICs for a particular technology is often based upon the complexity of the design and the anticipated yield. In addition, the capacity of the manufacturing facility is also based on an anticipated yield for all work in progress. It has, therefore, become critical to accurately predict yield for a particular design in a manufacturing process.

Circuit designs often include redundant elements for specified portions so that yield can be increased. Current yield prediction tools treat both the redundant and non-redundant elements equally when performing their analysis. Unfortunately, this treatment can result in yield predictions that are inaccurate because they do not consider that faults in redundant features will not impact yield to the same extent as non-redundant features.

It would, therefore, be a distinct advantage to have a method, system, and computer program product that would treat redundant and non-redundant elements differently during yield estimations so that yield can be more accurately predicted.

SUMMARY OF THE PRESENT INVENTION

In one aspect, the present invention is a method of performing critical area analysis on an integrated circuit graphical design data having redundant and non-redundant elements. The method includes the step of generating a graphical data symbol representation of the integrated circuit design. The method also includes the step of identifying any redundant elements of the integrated circuit in the graphical data symbol representation with unique identifiers. The method further includes the step of analyzing the graphical data symbol representation for undesired open-causing defects in wires and/or vias for the non-redundant elements.

BRIEF DESCRIPTION OF THE DRAWINGS

The present invention will be better understood and its advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method, apparatus, and computer program product for performing yield estimates on integrated circuit designs having both redundant and non-redundant elements. The present invention generates Graphical Design Data Shapes (GDD) for performing Critical Area Analysis (CAA) for shorts and opens. The CAA analysis for shorts uses the GDD and performs the analysis for both the redundant and non-redundant elements of the design. The CAA analysis for opens uses the GDD and performs the analysis for only the non-redundant elements of the design.

Figure 1:
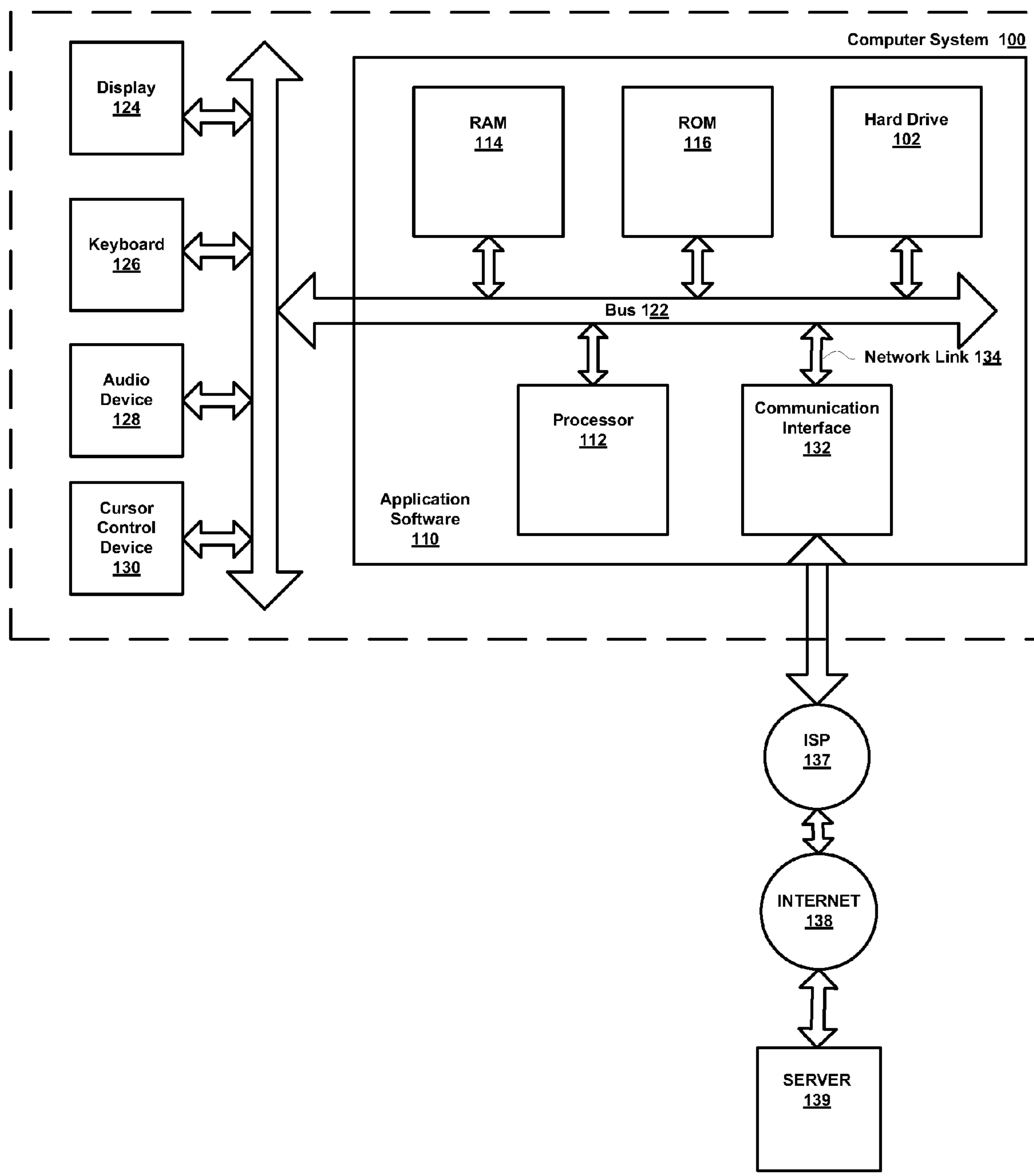
FIG. 1 is a block diagram a computer system that implements a preferred embodiment of the present invention.

Reference now being made to FIG. 1, a block diagram is shown illustrating a computer system 100 that implements a preferred embodiment of the present invention. Computer System 100 includes various components each of which is explained in greater detail below.

Bus 122 represents any type of device capable of providing communication of information within Computer System 100 (e.g., System bus, PCI bus, cross-bar switch, etc.)

Processor 112 can be a general-purpose processor (e.g., the PowerPC™ manufactured by IBM or the Pentium™ manufactured by Intel) that, during normal operation, processes data under the control of an operating system and application software 110 stored in a dynamic storage device such as Random Access Memory (RAM) 114 and a static storage device such as Read Only Memory (ROM) 116. The operating system preferably provides a graphical user interface (GUI) to the user.

The present invention, including the alternative preferred embodiments, can be provided as a computer program product, included on a machine-readable medium having stored on it machine executable instructions used to program computer system 100 to perform a process according to the teachings of the present invention.

The term "machine-readable medium" as used in the specification includes any medium that participates in providing instructions to processor 112 or other components of computer system 100 for execution. Such a medium can take many forms including, but not limited to, non-volatile media, and transmission media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or rewriteable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the preferred embodiment, an example of a non-volatile medium is the Hard Drive 102.

Volatile media includes dynamic memory such as RAM 114. Transmission media includes coaxial cables, copper wire or fiber optics, including the wires that comprise the bus 122. Transmission media can also take the form of acoustic or light waves, such as those generated during radio wave or infrared data communications.

Moreover, the present invention can be downloaded as a computer program product where the program instructions can be transferred from a remote computer such as server 139 to requesting computer system 100 by way of data signals embodied in a carrier wave or other propagation medium via network link 134 (e.g., a modem or network connection) to a communications interface 132 coupled to bus 122.

Communications interface 132 provides a two-way data communications coupling to network link 134 that can be connected, for example, to a Local Area Network (LAN), Wide Area Network (WAN), or as shown, directly to an Internet Service Provider (ISP) 137. In particular, network link 134 may provide wired and/or wireless network communications to one or more networks.

ISP 137 in turn provides data communication services through the Internet 138 or other network. Internet 138 may refer to the worldwide collection of networks and gateways that use a particular protocol, such as Transmission Control Protocol (TCP) and Internet Protocol (IP), to communicate with one another. ISP 137 and Internet 138 both use electrical, electromagnetic, or optical signals that carry digital or analog data streams. The signals through the various networks and the signals on network link 134 and through communication interface 132, which carry the digital or analog data to and from computer system 100, are exemplary forms of carrier waves transporting the information.

In addition, multiple peripheral components can be added to computer system 100. For example, audio device 128 is attached to bus 122 for controlling audio output. A display 124 is also attached to bus 122 for providing visual, tactile or other graphical representation formats. Display 124 can include both non-transparent surfaces, such as monitors, and transparent surfaces, such as headset sunglasses or vehicle windshield displays.

A keyboard 126 and cursor control device 130, such as mouse, trackball, or cursor direction keys, are coupled to bus 122 as interfaces for user inputs to computer system 100.

The execution of application software 110 on computer system 100 according to the preferred embodiment of the present invention is explained in greater detail below in connection with FIG. 4.

Figures 2, 3:
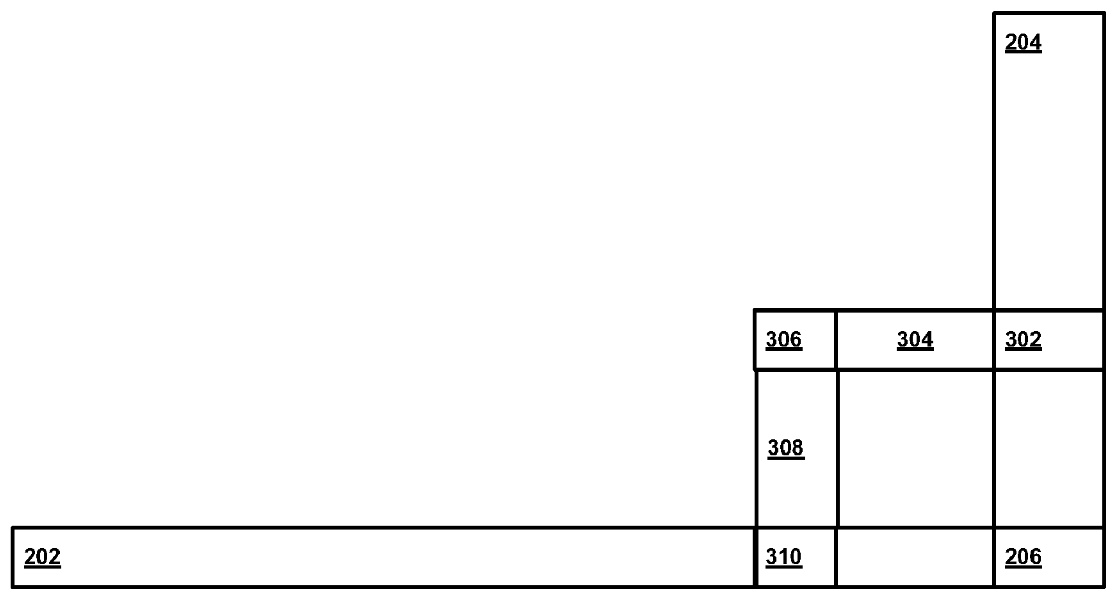
FIG. 2 is a wiring diagram illustrating two wires and a via.
FIG. 3 is a wiring diagram illustrating the addition of redundant elements to the wiring diagram of FIG. 2.

Reference now being made to FIG. 2, a wiring diagram 200 is shown illustrating wires 202 and 204 and a via 206. Wires 202 and 204 reside on layers X and X+1, respectively and are connected one to another by the via 206 that extends through both layers X and X+1. Wiring diagram 200 does not use redundant elements.

Reference now being made to FIG. 3, a wiring diagram 300 is shown illustrating the addition of redundant elements to the wiring diagram 200 of FIG. 2. More specifically, redundant wires 304 (redundant for part of 202) and 308 (redundant for part of 204) and redundant vias (interlayer connections) 302, 306, and 310 have been added to connect the wires 202, 308, 204, and 304 one to another.

Critical area of an integrated circuit is a measure that reflects the sensitivity of the layout to random defects occurring during the manufacturing process and can be mathematically described by:

$$Ac = \int_0^{\infty} A(r)D(r)dr$$

Where A(r) denotes the area in which the center of a defect of radius r must fall in order to cause circuit failure and D(r) is the density function of the defect size.

As previously discussed, standard shapes-based CAA tools fail to adequately analyze electrical redundancy. More specifically, these tools treat all circuits (redundant and non-redundant) equally when performing CAA. In the case of redundant circuits, this analysis is too strict. The failure of a redundant element due to an opens defect will not result any failure of the design, since this only removes the redundancy capability. In fact, for this reason, the CAA for opens can ignore the redundant elements.

A redundant element that incurs a shorts defect will cause the design to operate incorrectly. Consequently, CAA for shorts will be performed for both the redundant and non-redundant elements.

Figure 4:
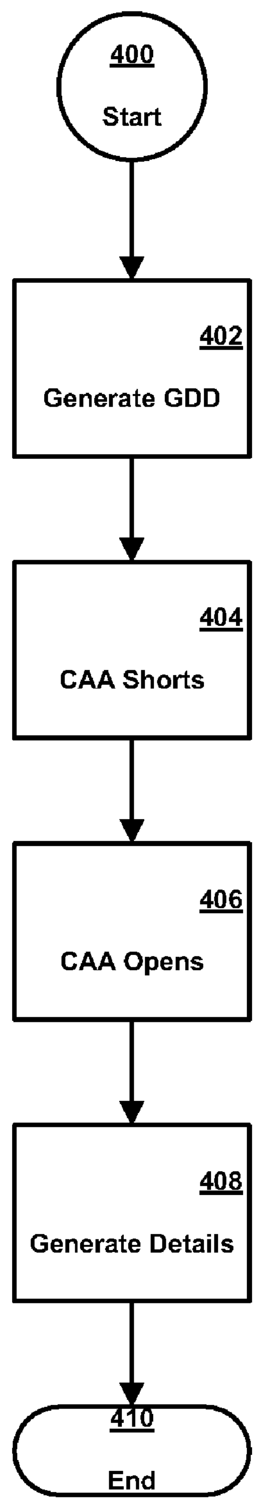
FIG. 4 is a flow chart illustrating the method for performing Critical Area Analysis (CAA) on an integrated circuit design according to the teachings of the present invention.

Reference now being made to FIG. 4, a flow chart is shown illustrating the method for performing CAA on an integrated circuit design according to the teachings of the present invention. The method begins upon the execution of the software 110 (FIG. 1) to generate a Graphical Design Data (GDD) used for the design (Steps 400-402). The software uses the generated GDD to perform CAA for shorts on each layer of the design for both redundant and non-redundant circuit elements (Step 404).

The redundant elements are removed from the GDD and the CAA is performed for opens (Step 406). Alternatively, the GDD can be generated with unique identifiers such as tag data, wire codes, attribution, or a different layer name for the redundant elements which then can be used during the CAA for opens to ignore the redundant elements or otherwise remove them. The unique identifiers can be added to the library of elements used to generate the GDD or by a router or similar tool. The combined results of both the critical area analysis for both open and shorts are used to predict the yield of the current design in a specified manufacturing environment (Steps 408-410).

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A method of performing critical area analysis on an integrated circuit design having redundant and non-redundant elements, the method comprising the steps of:

generating a graphical data symbol representation of the integrated circuit design;

identifying any redundant elements of the integrated circuit in the graphical data symbol representation with unique identifiers;

analyzing the graphical data symbol representation for undesired open-causing defects in wires and/or vias for the non-redundant elements;

treating redundant and non-redundant elements differently during yield estimations in order to perform the critical area analysis; and wherein the generating comprises generating graphical design data (GDD) shapes for performing the critical area analysis for shorts and opens, wherein the critical area analysis for shorts uses the GDD and performs the critical area analysis for both the redundant and the non-redundant elements of the integrated circuit design and wherein the critical area analysis for the opens uses the GDD and performs the critical area analysis for only the non-redundant elements of the integrated circuit design.

2. The method of claim 1 further comprising the step of:

analyzing the graphical data symbol representation for shorts of wires and/or vias for both the redundant and non-redundant elements.

3. The method of claim 1 wherein the integrated circuit has multiple layers and the graphical data symbol representation is generated for each layer.

4. The method of claim 3 further comprising the step of:

analyzing the graphical data symbol representation for shorts of wires and/or vias for both the redundant and non-redundant elements.

5. The method of claim 4 wherein one or more of the redundant elements has an undesired open-causing defect, and the critical area analysis does not treat the open-causing defect as a fault that causes the integrated circuit to fail.

6. The method of claim 5 wherein one or more of the redundant elements has a shorting fault, and the critical area analysis accounts for the shorting fault that causes the integrated circuit to fail.

7. The method of claim 6 wherein one of the non-redundant elements has an undesired open-causing defect and the integrated circuit is correctly accounted for in critical area analysis.

8. The method of claim 1, further comprising:

generating graphical design data (GDD) shapes to perform critical area analysis for shorts on each layer of the integrated circuit design for both the redundant and non-redundant elements; and removing the redundant elements from the GDD and then performing critical area analysis for opens.

9. The method of claim 1, further comprising:

generating graphical design data (GDD) shapes with unique identifiers for the redundant elements; and then using the GDD during the critical area analysis for opens to one of ignore and remove the redundant elements.

* * * * *